(12) United States Patent
Heagey

(10) Patent No.: US 6,319,396 B1
(45) Date of Patent: *Nov. 20, 2001

(54) CLARIFIER CONE FOR FILTERING AND SEPARATING SOLIDS FROM SOLUTION

(76) Inventor: Robert F. Heagey, 5026 - 17th St. N., St. Petersburg, FL (US) 33714

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/080,976
(22) Filed: May 19, 1998
(51) Int. Cl.[7] .................................................. B01D 33/70
(52) U.S. Cl. .................. 210/151; 210/540; 210/262; 210/258; 210/265; 210/533; 210/DIG. 5
(58) Field of Search .............................. 210/DIG. 5, 151, 210/540, 262, 258, 255, 265, 150, 294, 533–535

(56) References Cited

U.S. PATENT DOCUMENTS

| | | | |
|---|---|---|---|
| 1,668,807 | * 5/1928 | Hawley | 210/258 |
| 3,469,702 | * 9/1969 | Perren | 210/540 |
| 4,554,074 | * 11/1985 | Broughton | 210/540 |
| 4,791,688 | * 12/1988 | Krishnakumar . | |
| 4,963,073 | * 10/1990 | Tash et al. . | |
| 4,994,179 | * 2/1991 | Keeter | 210/540 |
| 5,160,623 | * 11/1992 | Rubin | 210/634 |
| 5,435,914 | * 7/1995 | Bernhardt | 210/262 |
| 5,593,574 | * 1/1997 | VanToever | 210/151 |
| 5,738,796 | * 4/1998 | Bormann | 210/806 |
| 5,879,548 | * 3/1999 | Al-Ali . | |
| 5,967,760 | * 10/1999 | Howie . | |

* cited by examiner

Primary Examiner—Chester T. Barry
(74) Attorney, Agent, or Firm—Arthur W. Fisher, III

(57) ABSTRACT

A separator vessel and a biological reactor vessel are connected in tandem to remove separable wastes from waste water and to deactivate toxins, respectively. In a first embodiment, waste water is gravity fed into the separator vessel where it flows downwardly through a bed of loose pellets that causes coalescing of organic matter. A cone-shaped deflector, having its wide end facing downwardly, deflects the downward flow radially outwardly toward the side walls of the separator vessel. Heavy waste accumulates in a cone-shaped waste concentration zone at the bottom of the separator vessel and is pumped away to a disposal point. Lighter water reverses its downward direction and is pulled upwardly into the cone-shaped deflector by a pump and sent to the biological reactor vessel where nitrification changes toxins to harmless nitrates. In a second embodiment, the separator vessel and biological reactor vessel have a flat bottom wall and a second cone-shaped deflector is positioned at the bottom of the respective vessels with its wide mouth in closely spaced relation to the flat bottom wall. Heavy waste is pumped through the second cone-shaped deflector to the disposal point.

37 Claims, 2 Drawing Sheets

CLARIFIER CONE FOR FILTERING AND SEPARATING SOLIDS FROM SOLUTION

BACKGROUND OF THE INVENTION

1. Field of the Invention

This invention relates, generally, to the art of filtration. More particularly, it relates to an apparatus that filters and separates solids and organic pollutants from solution.

2. Description of the Prior Art

Oil and solids must be separated from water as a preliminary step in both waste water treatment and oil recovery processes to facilitate further filtration and clarification.

Moreover, the need to effectively filter culture water that maintains aquatic organisms has increased due to the enactment of legislation that limits the use of municipal and ground water supplies.

Existing technologies for separation of mixed fluids includes a wide variety of complex machines such as deep hydroclones, centrifuges, and large circular tanks with bottom scrapers and surface skimmers. The fluid flow in these machines follows a spiral or rising path of travel. Other designs create horizontal flow over laminar plates in rectangular tanks.

After an initial separation step, the fluid being treated is filtered to remove impurities of both particulate and dissolved matter. Typically, a mechanical means having some type of matter-sifting screen is employed. Such techniques are effective but require expensive moving parts (such as a rotating screen, e.g.) and a backflow of fluid is needed to clean (backwash) the screen.

Particle filters use a preselected type of unconsolidated material such as sand or gravel to trap downwardly-flowing particulate matter in the upper layers at the surface of the media. The upper layers of the media become clogged easily; accordingly, frequent backwashing is required. Backwashing should be reduced to a minimum, however, because it causes loss of water and medium.

Gravitational or sedimentation processes simply hold water or slow the flow rate to a very low speed so that materials kept in suspension by moving water will eventually settle. To be effective, this type of filtration requires large containment areas to prolong the detention or dwell time of the fluid being treated.

Centrifuges and hydroclones, respectively, magnify the weight of suspended particles or heavier fluids by spinning the container or circulating the water flow. In applications requiring treatment of large volumes of fluid, such units can be prohibitively expensive or too large and deep, requiring excavation or high head pump pressure, depending upon site conditions.

A centrifuge, being mechanically driven, has additional maintenance costs as well. Units of this type are designed to remove grit and solids but fail to satisfactorily remove oily or greasy waste.

Filtration of waste water or recirculated water used to culture aquatic organisms must physically remove waste solids and remove or neutralize dissolved nutrients. The physical removal of waste solids is typically accomplished by employing a settling tank, a hydroclone or a straining type of filter as mentioned above.

Nitrification is the biological conversion of toxic ammonia waste compounds to harmless nitrates. Nitrification or biological filtration systems provide a medium with a large surface area for aerobic (oxygen consuming) bacteria to grow. This type of filtration is critical for the culture of aquatic organisms using recirculated water.

Biological contactors for biological filtration systems include submerged bed, trickling filters, rotating disks and drums, and fluidized bed types.

The submerged bed (commonly called undergravel) filtration system constrains culture water to flow vertically downward through a support media; the bacteria colonizes the support media. This is the least desirable nitrification process because the media is oxygen-limited and traps solids and bacterial waste products. Thus, the media becomes clogged and channeled, thereby leading to colonization of anaerobic (non-oxygen consuming) bacteria in the clogged or low flow areas known as dead spots. Anaerobic bacteria live only in the absence of oxygen and convert nitrate back to toxic nitrite and also produce hydrogen sulfide which is also very toxic to aquatic animals.

Trickling filters are the most popular nitrifiers for urban waste water and salt water aquaria applications. These filters are never oxygen limited because the substrate is suspended above the water with the flow trickling down. However, trickling filters do not capture solids and may even contribute to solids generation. The trickling filter is also subject to drying out and subsequent die-off of organisms if the flow is not constant. Accordingly, trickling filters require some means of solids separation both before and after the filtration unit.

Rotating discs and drums work by moving colonized media through waste water with intermittent contact with ambient air. These filters, like trickling filters, are therefore never oxygen limited. However, rotating media of this sort involves moving mechanical parts and therefore inherent power and wear problems. Filters of this type also do not capture solids.

Fluidized bed filters work by suspending a medium with a very large surface area and having a density slightly greater than that of water. This suspension of medium is maintained by a vertically upward flow. Filters of this type are resistant to clogging and are considered to be the most effective filters for aquaculture nitrification applications. However, problems with upflow suspended medium arise because such filters are oxygen limited and do not separate solids.

Some new unconsolidated bed filters use a floating medium in an upflow configuration. However, floating low density plastic pellets have been used for biological filtration in aquaculture applications since the 1950's. Recent innovations include means for pumping culture water upwardly through a floating "bed" of pellets; a strainer-type screen prevents the pellets from exiting the filter vessel. Problems with current applications of floating pellet filtration stem from the inherent pressure needed to push water up through the medium and the fast buildup of flocculent matter which further impedes water flow and causes pressure buildup. These filters are also oxygen-limited and dependent upon the oxygen content of the water coming into the filter. However, in view of the art considered as a whole at the time the present invention was made, it was not obvious to those of ordinary skill in this art how the needed improvements could be provided.

SUMMARY OF THE INVENTION

The long-standing but heretofore unfulfilled need for an apparatus that overcomes the limitations of the prior art is now met by a new, useful, and nonobvious invention. The present invention provides a separator vessel in fluid communication with a waste water treatment apparatus. Each can be used independent of each other although optimum benefits are achieved when used in conjunction.

The separator vessel holds a predetermined volume of waste water undergoing treatment. Coalescing means for causing coalescing of organic matter is disposed within the separator vessel in floating relation to the waste water contained therewithin.

A separation zone is positioned downwardly of the coalescing means, and a waste concentration zone is positioned downwardly of the separation zone.

A cone-shaped deflector is positioned within the separator vessel; it has a longitudinal axis of symmetry that is coincident with a longitudinal axis of symmetry of the separator vessel.

A pump means is positioned external to the separator vessel and an outlet pipe provides fluid communication between waste water contained within the separator vessel and said pump means.

The cone-shaped deflector has a narrow base in fluid communication with the outlet pipe, and a wide mouth positioned downwardly of the narrow base, i.e., the mouth has a predetermined diameter greater than a predetermined diameter of the base. The mouth is positioned in the separator zone above the waste concentration zone.

The pump means creates a suction within the cone-shaped deflector when the pump means is activated. Accordingly, water containing coalesced organic matter and inorganic separable solids flows downwardly from the coalescing means and is deflected radially outward from a longitudinal axis of symmetry of the separator vessel towards side walls of the separator vessel by the cone-shaped deflector. Treated water that is substantially free of separable wastes is pulled into the cone-shaped deflector by the suction therewithin and is carried out of the separator vessel through the outlet pipe.

A biological reactor vessel is positioned downstream from the separator vessel; the outlet pipe provides fluid communication between the separator vessel and the biological reactor vessel. A pump means pumps the treated water from the separator vessel to the biological reactor vessel because the latter is slightly elevated with respect to the former.

The biological reactor vessel includes nitrification means positioned within the biological reactor vessel in floating relation to the treated water. The nitrification means converts ammonia waste compounds in the treated water to harmless nitrates. In all other respects, the biological reactor vessel is constructed much like the separator vessel.

The inherent passive process of this invention virtually eliminates the drawbacks of the prior art, the novel apparatus includes no moving parts, thereby saving construction and maintenance costs. The novel apparatus is not subject to clogging and there is no pressure buildup in the novel apparatus because flow is directed freely downward by gravity.

Perhaps the most significant advantage, however, is the reduction in transport velocity which allows suspended solids and flocculents to settle or rise to be separated. The apparatus of this invention is designed to be run continuously during separation and filtration processes; there is no need to stop pumps or divert flow to clean filter vessels or media.

Importantly, the downward flow assists with flushing flocculent material collected within the floating medium. Collected debris or separated fluid is flushed by merely opening or adjusting exit fluid valves. No back-washing or fluidization of the pellet pack with concomitant rinsing and settling time is required. This feature alone results in savings of labor, time, and water.

The novel apparatus provides a flow-through system and therefore has the phase separation qualities and the waste water treatment system of flow-through systems.

The clarifier cone is a nozzle oriented so that the larger opening is facing down towards the bottom of the settlement chamber. The clarifier cone shape and orientation has two essential functions. First, it deflects settleable solids away from the exit piping; second, its increased cross-sectional area or bore size slows the velocity of exiting fluid at the entrance to the cone. These two actions allow only lighter cleaner effluent to exit a settlement or filtration chamber.

The downward flow of the fluid within the vessel promotes the settlement of solids. The downwardly-sloping sides of the cone displace solids away from the wide aperture of the cone exit chamber. The large bore entrance to the exit chamber has the same cross sectional area as the concentric (toroidal) space between the cone and the container vessel and therefore the velocities are equal in said respective spaces. However, the direction of the flow within the cone is reversed with respect to the direction of the flow outside the cone, i.e., the direction of the flow within the cone is up and thus is away from the gravitational pull exerted on entrained solids outside the cone. Inertia, i.e., the resistance to change of direction, and a gap between the two opposing flows further promotes the continual fallout of solids from the suspension. Settled solids are concentrated at the bottom of the container for easy removal without disturbing the separation process.

The clarifier pellet filter works by first aerating the influent water by a distribution/diffusion plate onto the surface bed of floating pellets for optimum aerobic bacterial nitrification (biological filtration); this takes place in an upper zone of the novel apparatus. Settleable solids and biofloc (bacterial waste) rain down from the upper zone and are deflected away from the return plumbing by the novel clarifier which is provided in the form of an inverted cone or suction nozzle. The clarifier cone also serves to significantly reduce the velocity but not the flow of the water being treated. Velocity being inversely related to the cross sectional area of the conduit, the velocity of the flow is reduced as it flows toward the large cross-sectional area of the mouth of the cone. The slow upward flow at the base of the clarifier cone allows further settlement of solids at the base of the filter.

Accumulated solids at the bottom of the filter are easily flushed away with a waste valve with minimal water loss, no down time or waiting for settlement, and no stirring or disturbing the biologically active filter pellets. The novel filter is extremely resistant to clogging because water passively flows down through a floating bed of pellets. Passive flow also means there is absolutely no back pressure, thereby allowing the use of a very efficient low head/high volume pump.

A primary object of this invention is to provide a highly effective water treatment apparatus.

Another important object is to accomplish the foregoing object with a low initial cost apparatus having no moving parts.

Another object is to provide a low maintenance water treatment apparatus.

Still another major object is to provide an apparatus that reduces clogging to a minimum and that does not require back flushing.

Yet another significant object is to provide an apparatus that reduces transport velocity therethrough so that lighter impurities may be drawn into the cone-shaped deflector for further treatment in the biological reactor vessel and so that heavier impurities may settle out in the waste concentration zone and be disposed of.

A more specific object is to disclose a water treatment apparatus having a cone-shaped deflector that deflects downwardly flowing waste water radially outwardly for greater dispersion.

Another specific object is to provide a water treatment apparatus having a cone-shaped deflector where the mouth of the cone has a predetermined width that equalizes the area of the mouth with the toroidal area around said mouth.

The invention accordingly comprises the features of construction, combination of elements and arrangement of parts that will be exemplified in the construction hereinafter set forth, and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which.

DETAILED DESCRIPTION OF THE PREFERRED EMBODIMENT

Figure 1:
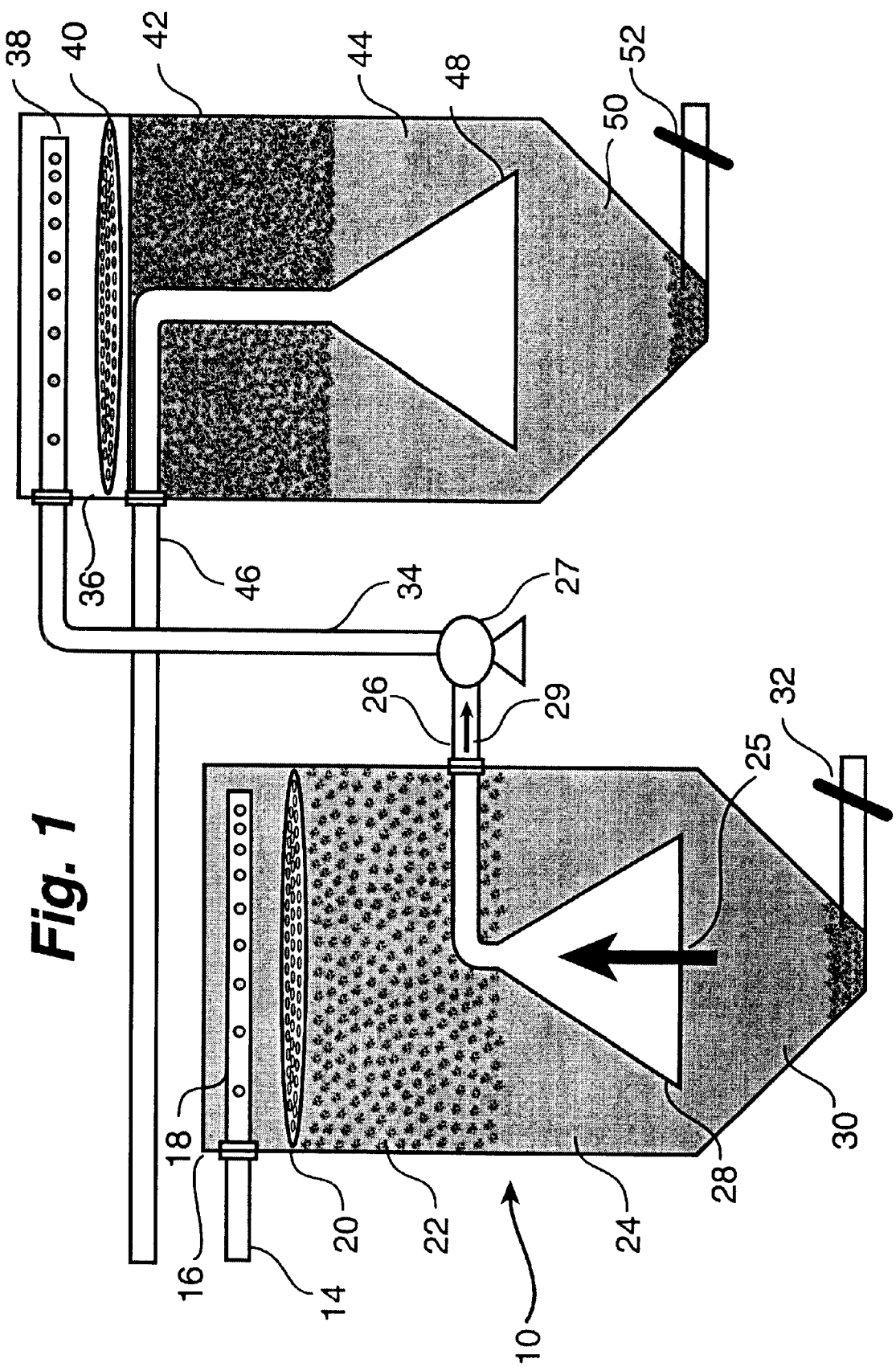
FIG. 1 is a schematic diagram of a first embodiment of the novel apparatus.

Referring now to FIG. 1, it will there be seen that an exemplary embodiment of the invention is denoted as a whole by the reference numeral 10.

Waste water to be treated is gravity fed through supply pipe 14 to separator vessel 16. Waste water is distributed within separator vessel 16 through a submerged distributor 18 which is of manifold construction as depicted; it has a series of perforations with decreasing incremental spacing between said perforations to maintain pressure throughout the distributor manifold to effect even distribution.

The evenly distributed waste water flows in a downward direction through submerged perforated diffuser plate 20 that further distributes flow to confounding area 22; said area is filled with loose polypropylene or other floating medium which breaks the waste water flow and causes the coalescing of organic matter. Water thus loaded with sloughed coalesced organic matter and inorganic separable solids flows downward into separation zone 24 where such heavier coalesced organic matter and inorganic separable solids are entrained by gravity and inertia to continue falling downward. Such organic matter and solids are deflected away from outlet pipe 26 by conical deflector 28 and are thus directed into waste concentration zone 30. Waste thus concentrated is evacuated by valve 32.

Lighter water, substantially free of separable wastes, reverses direction and flows vertically upward as indicated by directional arrow 25 into the interior of conical deflector 28 and from there its path of travel takes it to first outlet pipe 26.

A relatively small, low head, high efficiency pump 27 pulls water out said first outlet pipe as indicated by directional arrow 29. The water that is pumped flows through pipe 34 to biological reactor vessel 36.

Water supplied to biological reactor vessel 36 is disbursed within said vessel by distributor 38 of manifold construction. Distributor 38 has a series of perforations formed therein with decreasing incremental spacing between said perforations to maintain pressure throughout said distributor. Note that vessel 36 is slightly elevated with respect to separator vessel 16. This effects an aeration process across a perforated diffusion plate 40 that further distributes flow to drip and thus further aerate water supplied to the surface of a floating plastic medium pellet pack 42 that is fluidized and maintained in a nonclogged state by the downward flow.

Bacterial colonies of Nitrosomonas and Nitrobacter genus grow upon the large surface area of the medium; said colonies convert dissolved ammonia waste products to nitrite and from nitrite to harmless nitrates respectively.

Sloughed bacterial cells, waste products, and other coalesced organic wastes fall from the floating pellet pack into separation zone 44 where such heavier coalesced organic matter and inorganic separable solids are entrained by gravity and inertia so that they continue falling downward and are deflected away from second outlet pipe 46 by conical deflector 48 and into waste concentration zone 50. Waste thus concentrated is evacuated by opening valve 52.

The water, now lighter because it is substantially free of separable wastes, flows in a reverse direction, i.e., upwardly into the interior of conical deflector 48 to said second outlet pipe 46. This water is made suitable for use in a recirculating system in that it is substantially free of separable solids and ammonia waste products have been biologically converted to nitrates.

Figure 2:
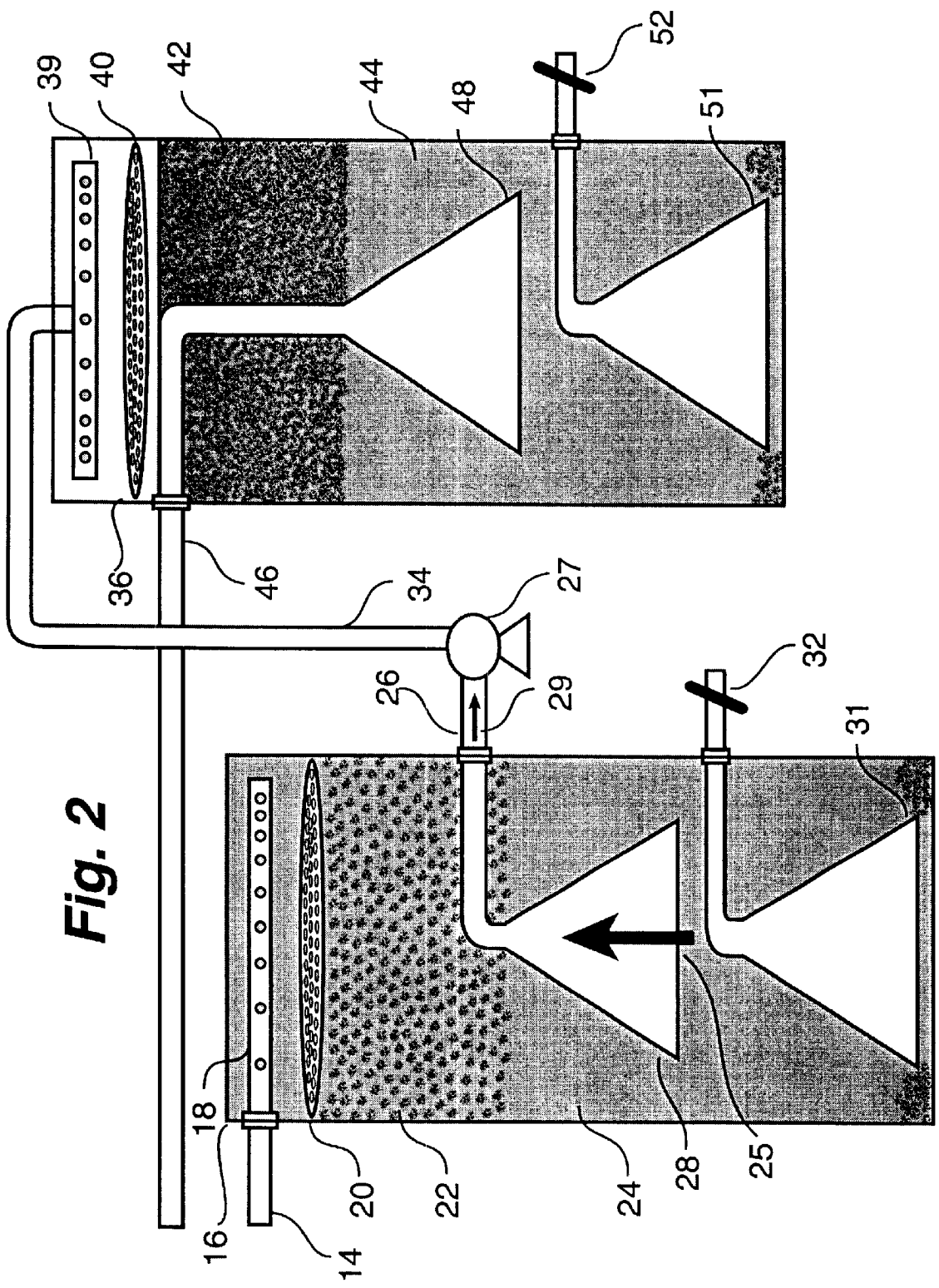
FIG. 2 is a schematic diagram of a second embodiment thereof.

FIG. 2 depicts an alternative embodiment for flat bottomed vessels. This embodiment adds another conical deflector 31 that is positioned just above the flat bottom of settlement vessel 16. This cone shape serves to concentrate settled solids around the base of the cone perimeter. The small space between the opening of the cone and the floor of vessel 16 creates a suction when valve 32 is opened.

Biological vessel 36 of this alternative embodiment employs a rotating spray diffuser 39 to evenly spread and directly aerate the influent onto pellet pack 42. A second conical deflector 51 is positioned with its mouth in closely spaced relation to the flat bottom of vessel 36; it works in the same way as settlement waste collector 31 when valve 52 is opened.

In both embodiments, the law of conservation of mass is the basis of the fluid dynamics responsible for the drop in velocity at the base of the clarifier cone. The magnitude drop in velocity is equal to the square of the proportional change in diameter (large/small) or the proportional difference in the square of the radii at the top and bottom of the cone, as illustrated in the following example.

Q(top flow)=Q(bottom flow)
Q(flow)=velocity(m/sec)×area($m^2$)=$m^3$/sec
velocity(m/sec)=flow($m^3$/sec)/area($m^2$)
V(top)×Area(top)=V(bottom)×Area (bottom)
V(bottom)/V(top)=Area(top)/Area(bottom)
V(bottom)/V(top)=r(top)$^2$/r(bottom))$^2$
V(bottom)/V(top)=(Diameter(top)/Diameter(bottom))$^2$
cone diameter: top: 1 meter
   bottom: 4 meters
container inflow=outflow=1 $m^3$/second
velocity top: 1 $m^3$/sec/(0.5 m)$^2$×π=1.273240 m/sec
velocity bottom: 1 $m^3$/sec/(2 m)$^2$×π=0.0795775 m/sec
velocity change: 1.273240 m/sec/0.0795775 m/sec=16×

(diameter change)$^2$: $(4/1)^2=16\times$
radius$^2$ change: $(2\text{ m})^2/(0.5\text{ m})^2=16\times$ The size of the large aperture of the cone should approximate one half of the cross-sectional area of the container vessel in order to maximize settlement with equal velocity in both downward and upward directions. The optimum diameter of the large aperture or mouth is calculated as the container diameter (at that point where the large aperture is affixed) divided by the square root of 2 or 1.414213562. In the example above, the cone would require a container vessel equal to 4×1.414213562 or 5.66 meters in diameter.

The necessary size of the settlement vessel and cone may be calculated if the settlement velocities are predetermined. Conversely, the flow can be adjusted to maximize separation when using an existing separator cone and vessel.

It will thus be seen that the objects set forth above, and those made apparent from the foregoing description, are efficiently attained and since certain changes may be made in the foregoing construction without departing from the scope of the invention, it is intended that all matters contained in the foregoing construction or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,

What is claimed is:

1. A waste water treatment apparatus comprising a separator vessel having no moving parts and a biological reactor vessel having no moving parts having a pump operatively disposed therebetween:

said separator vessel comprising:

a side wall forming an interior having an upper portion in fluid communication with a waste water supply to receive waste water therefrom; a coalescing means for causing coalescing of organic matter present in the waste water received from the waste water supply disposed within said separator vessel in floating relation to the waste water confined within said separator vessel;

a separation zone having a top and a bottom disposed downwardly of said coalescing means;

a waste concentration zone disposed downwardly of said separation zone; and a cone deflector including a chamber having a mouth and a base with an interior therebetween disposed within said separator vessel;

whereby treated waste water is drawn into said deflector by the suction of the pump and carried from said separator vessel through a first outlet;

said mouth having a cross sectional area substantially equal to a cross sectional area of a toroidal space between said mouth and said sidewall of said separator vessel so that a downward flow of the waste water in said separator vessel in said toroidal space has a velocity substantially equal to a velocity of an upward flow of treated waste water in said deflector and said substantially equal but opposite-in-direction velocities promoting a continual fallout of solids from the waste water and said biological reactor vessel comprising:

a sidewall positioned downstream from said separator vessel;

a first outlet pipe providing fluid communication between said separator vessel and said biological reactor vessel;

a second outlet for carrying treated waste water out of said biological reactor vessel;

whereby the pump carries said treated waste water from said separator vessel to said biological reactor vessel and said treated waste water flows through said second outlet pipe for use in a recirculating system.

2. The apparatus of claim 1 wherein said cone deflector includes a longitudinal axis of symmetry coincident with a longitudinal axis of symmetry of said separator vessel.

3. The apparatus of claim 1 further comprising:

a first outlet pipe that provides fluid communication between the waste water contained within said separator vessel and the pump to create the suction within said interior when the pump is activated;

said base of said cone deflector in fluid communication with said first outlet pipe;

said mouth of said cone deflector disposed downwardly of said base;

said mouth having a predetermined diameter greater than a predetermined diameter of said base;

said mouth being positioned in said separation zone and being positioned above said waste concentration zone;

whereby waste water containing coalesced organic matter and inorganic separable solids flows downwardly from said coalescing means and is deflected by said cone deflector.

4. The apparatus of claim 1 wherein said coalescing means includes pieces of low density floating materials.

5. The apparatus of claim 1 further comprising a manifold positioned within said separator vessel in submerged relation to the waste water for distributing waste water from the waste water supply across a predetermined area within said separator vessel.

6. The apparatus of claim 5 further comprising a diffusion plate positioned in said separator vessel at a preselected location below said manifold submerged within the waste water contained within said separator vessel.

7. The apparatus of claim 5 wherein said manifold is at least partially disposed within the upper portion of said separator vessel so that the waste water is gravity fed to the interior of said separator vessel.

8. The apparatus of claim 1 wherein said waste concentration zone having a top and a bottom defined by a cone-shaped sidewall of said separator vessel at the bottom of said separator vessel inverted relative to said cone deflector, said sidewall of said waste concentration zone converge from said top to said bottom of said waste concentration zone.

9. The apparatus of claim 8 further comprising a waste valve positioned in fluid communication with said waste concentration zone so that concentrated waste in said waste concentration zone can be flushed from said waste concentration zone by opening said waste valve.

10. The apparatus of claim 1 wherein said separator vessel has a flat bottom and wherein a second deflector is positioned in said waste concentration zone so that a wide mouth thereof is in closely spaced relation to said flat bottom of said separator vessel, said second deflector being in longitudinal alignment with said cone deflector.

11. The apparatus of claim 10 further comprising a waste valve positioned in fluid communication with a narrow end of said second deflector so that concentrated waste can be flushed from said waste concentration zone through said second deflector by opening said waste valve.

12. The apparatus of claim 1 further comprising nitrification means disposed within said biological reactor vessel for converting nitrogenous waste compounds in said treated water to nitrates, said nitrification means being positioned within said biological reactor vessel in floating relation to the treated water.

13. The apparatus of claim 12 wherein said nitrification means includes a fluidized bed including a pellet pack disposed within said biological reactor vessel in floating relation to the treated water.

14. The apparatus of claim 13 wherein said nitrification means includes at least one bacterial colony of Nitrosomonas species living in said fluidized bed for converting dissolved nitrogenous waste compounds to nitrite.

15. The apparatus of claim 14 wherein said nitrification means further includes at least one bacterial colony of Nitrobacter species living in said fluidized bed for converting nitrite to nitrates.

16. The apparatus of claim 12 further comprising:
a separation zone disposed downwardly of said nitrification means;
a waste concentration zone disposed downwardly of said separation zone of said biological reactor vessel;
a deflector positioned within said biological reactor vessel;
said deflector within said biological reactor vessel having a longitudinal axis of symmetry coincident with a longitudinal axis of symmetry of said biological reactor vessel;
a second outlet;
said deflector within said biological reactor vessel having a base;
said deflector within said biological reactor vessel having a mouth disposed downwardly of said base;
said mouth of said deflector within said biological reactor vessel having a predetermined diameter greater than a predetermined diameter of said base within said biological reactor vessel;
said mouth of said deflector within said biological reactor vessel being positioned in said separator zone within said biological reactor vessel and being disposed above said waste concentration zone within said biological reactor vessel;
the second pump creating a suction within said deflector when the second pump is activated;
whereby treated waste water flows downwardly from said nitrification means and is deflected radially outward from said longitudinal as of symmetry of said biological reactor vessel toward said sidewall by said deflector within said biological reactor vessel;
whereby treated waste water rises into said deflector within said biological reactor vessel and is carried out of said biological reactor vessel through said second outlet.

17. The apparatus of claim 16 further comprising a manifold means disposed within said biological reactor vessel above a water level of the treated water contained within said biological reactor vessel for distributing treated water from said separator vessel across a predetermined area within said biological reactor vessel.

18. The apparatus of claim 17 further comprising a diffusion plate disposed in said biological reactor vessel at a preselected location below said manifold means and above the water level of the treated water contained within said biological reactor vessel.

19. The apparatus of claim 16 wherein said biological reactor vessel is elevated with respect to said separator vessel so that the treated water is not gravity fed from said separator vessel to said biological reactor vessel.

20. The apparatus of claim 14 wherein said waste concentration zone is defined by cone-shaped sidewalls of said biological reactor vessel at the bottom of said biological reactor vessel and wherein a cone shape defined by said cone-shaped sidewalls is inverted with respect to said deflector within said biological reactor vessel, said sidewalls of said waste concentration zone converging toward one another from top to bottom of said waste concentration zone.

21. The apparatus of claim 20 further comprising a waste valve positioned in fluid communication with said waste concentration zone so that concentrated waste in said waste concentration zone can be flushed from said waste concentration zone by opening said waste valve.

22. The apparatus of claim 14 wherein said biological reactor vessel has a flat bottom and wherein a second deflector is positioned in said waste concentration zone so that a wide mouth thereof is in closely spaced relation to said flat bottom of said biological reactor vessel, said second deflector being in longitudinal alignment with said first deflector.

23. The apparatus of claim 22 further comprising a waste valve positioned in fluid communication with a narrow end of said second deflector so that concentrated waste can be flushed from said waste concentration zone through said second deflector by opening said waste valve.

24. The apparatus of claim 12 further comprising:
a separation zone disposed downwardly of said nitrification means;
a waste concentration zone disposed downwardly of said separation zone of said biological reactor vessel;
a deflector positioned within said biological reactor vessel;
said deflector with said biological reactor vessel having a longitudinal axis of symmetry coincident with a longitudinal axis of symmetry of said biological reactor vessel;
said deflector within said biological reactor vessel having a base in fluid communication with said second outlet;
said deflector within said biological reactor vessel having a mouth disposed downwardly of said base;
said mouth of said deflector within said biological reactor vessel having a predetermined diameter greater than a predetermined diameter of said base;
said mouth of said deflector within said biological reactor vessel being positioned in said separator zone and being disposed above said waste concentration zone;
whereby treated waste water flows downwardly from said nitrification means and is deflected radially outward from said longitudinal axis of symmetry of said biological reactor vessel toward said sidewall by said deflector with said biological reactor vessel;
whereby treated waste water rises into said deflector with said biological reactor vessel and is carried out of said biological reactor vessel through said second outlet.

25. A waste water treatment apparatus for separating solids from solution comprising: a separator vessel including a side wall forming an interior having an upper portion in fluid communication with a waste water supply to receive waste water therefrom; coalescing means for causing coalescing of organic matter present in the waste water received from the waste water supply disposed within said separator vessel in floating relation to the waste water confined within said separator vessel;

a separation zone having a top and a bottom disposed downwardly of said coalescing means;

a waste concentration zone disposed downwardly of said separation zone; and a deflector including a chamber having a mouth and a base with an interior therebetween disposed within said separator vessel;

whereby treated waste water flows into said deflector and through a first outlet formed in said separator vessel;

said mouth having a cross sectional area substantially equal to a cross sectional area of a toroidal space between said mouth and said sidewall of said separator vessel so that a downward flow of the waste water in said separator vessel in said toroidal space has a velocity substantially equal to a velocity of an upward flow of treated waste water in said deflector and said substantially equal but opposite-in-direction velocities promoting a continual fallout of solids from the waste water.

26. The apparatus of claim 25 wherein said deflector includes an inclined surface.

27. The apparatus of claim 25 further comprising a manifold positioned within said separator vessel in submerged relation to the waste water for distributing waste water from the waste water supply across a predetermined area within said separator vessel.

28. The apparatus of claim 27 further comprising a diffusion plate positioned in said separator vessel at a preselected location below said manifold submerged within the waste water contained within said separator vessel.

29. The apparatus of claim 27 wherein said manifold is at least partially disposed within the upper portion of said separator vessel so that the waste water is gravity fed to the interior of said separator vessel.

30. The apparatus of claim 25 wherein said waste concentration zone includes a top and a bottom defined by a cone-shaped sidewall of said separator vessel at the bottom of said separator vessel inverted relative to said deflector, said sidewall of said waste concentration zone converge from said top to said bottom of said waste concentration zone.

31. A waste water treatment apparatus for separating solids from solution comprising: a biological reactor vessel having a sidewall; an outlet for carrying treated waste water out of said biological reactor vessel; a nitrification means disposed within said biological reactor vessel for converting nitrogenous waste compounds in said treated water to nitrates, said nitrification means being positioned within said biological reactor vessel in floating relation to the treated water; a separation zone disposed downwardly of said nitrification means;

a waste concentration zone disposed downwardly of said separation zone of said biological reactor vessel;

a deflector positioned within said biological reactor vessel;

said deflector within said biological reactor vessel having a longitudinal axis of symmetry coincident with a longitudinal axis of symmetry of said biological reactor vessel;

said deflector within said biological reactor vessel having a base; said deflector within said biological reactor vessel having a mouth disposed downwardly of said base;

said mouth of said defector within said biological reactor vessel having a predetermined diameter greater than a predetermined diameter of said base;

said mouth of said deflector within said biological reactor vessel being positioned in said separator zone and being disposed above said waste concentration zone;

whereby treated waste water flows downwardly from said nitrification means and is deflected radially outward from said longitudinal axis of symmetry of said biological reactor vessel toward said sidewall by said deflector with said biological reactor vessel;

whereby treated waste water rises into said deflector with said biological reactor vessel and is carried out of said biological reactor vessel through said outlet.

32. The apparatus of claim 29 wherein said nitrification means includes a fluidized bed including a pellet pack disposed within said biological reactor vessel in floating relation to the treated water.

33. The apparatus of claim 32 wherein said nitrification means includes at least one bacterial colony of Nitrosomonas species living in said fluidized bed for converting dissolved nitrogenous waste compounds to nitrite.

34. The apparatus of claim 33 wherein said nitrification means further includes at least one bacterial colony of Nitrobacter species living in said fluidized bed for converting nitrite to nitrates.

35. The apparatus of claim 31 further comprising a manifold means disposed within said biological reactor vessel above a water level of the treated water contained within said biological reactor vessel for distributing treated water from said separator vessel across a predetermined area within said biological reactor vessel.

36. The apparatus of claim 35 further comprising a diffusion plate disposed in said biological reactor vessel at a preselected location below said manifold means and above the water level of the treated water contained within said biological reactor vessel.

37. The apparatus of claim 31 wherein said waste concentration zone is defined by cone-shaped sidewalls of said biological reactor vessel at the bottom of said biological reactor vessel and wherein a cone shape defined by said cone-shaped sidewalls is inverted with respect to said deflector, said sidewalls of said waste concentration zone converging toward one another from top to bottom of said waste concentration zone.

* * * * *